(12) United States Patent
Chan et al.

(10) Patent No.: US 7,437,551 B2
(45) Date of Patent: Oct. 14, 2008

(54) PUBLIC KEY INFRASTRUCTURE SCALABILITY CERTIFICATE REVOCATION STATUS VALIDATION

(75) Inventors: Kok Wai Chan, Bellevue, WA (US); Wei Jiang, Kirkland, WA (US); Wei-Quiang Michael Guo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 834 days.

(21) Appl. No.: 10/817,246

(22) Filed: Apr. 2, 2004

(65) Prior Publication Data
US 2005/0228998 A1 Oct. 13, 2005

(51) Int. Cl.
*H04L 9/00* (2006.01)
(52) U.S. Cl. ..................................... 713/158
(58) Field of Classification Search ................. 713/175, 713/158
See application file for complete search history.

(56) References Cited

U.S. PATENT DOCUMENTS

| | | |
|---|---|---|
| 5,535,279 A | 7/1996 | Seestrom |
| 5,682,478 A | 10/1997 | Watson et al. |
| 5,757,920 A | 5/1998 | Misra et al. |
| 5,812,776 A | 9/1998 | Gifford |
| 5,812,784 A | 9/1998 | Watson et al. |
| 5,864,843 A | 1/1999 | Carino et al. |
| 5,875,296 A | 2/1999 | Shi et al. |
| 5,898,780 A | 4/1999 | Liu et al. |
| 5,918,228 A | 6/1999 | Rich et al. |
| 5,937,066 A | 8/1999 | Gennaro et al. |
| 5,944,824 A | 8/1999 | He |
| 5,948,064 A | 9/1999 | Bertram et al. |
| 5,987,232 A | 11/1999 | Tabuki |
| 6,006,332 A | 12/1999 | Rabne et al. |
| 6,044,155 A | 3/2000 | Thomlinson et al. |
| 6,088,451 A | 7/2000 | He et al. |

(Continued)

FOREIGN PATENT DOCUMENTS

EP 0969366 A1 1/2000

(Continued)

OTHER PUBLICATIONS

Wohlmacher, "Digital Certificates: A Survey of Revocation Methods," 2000, ACM Multimedia Workshop, pp. 111-114, California.

(Continued)

*Primary Examiner*—Gilberto Barron, Jr.
*Assistant Examiner*—Cordelia Kane
(74) *Attorney, Agent, or Firm*—Senniger Powers LLP (57) ABSTRACT

A system and method for retrieving certificate of trust information for a certificate validation process. Fetching servers periodically retrieve certificate revocation lists (CRLs) from servers maintained by various certificate issuers. The revoked certificate data included in the retrieved CRLs are stored in a central database. An authentication server receives a request from a client for access to a secure service and initiates a validation process. The authentication server retrieves revoked certificate data from the central database and compares the retrieved revoked certificate data to certificate of trust information received from the client along with the request. The authentication server denies access to the secure information if the certificate of trust information matches revoked certificate data from the central database, allows access if the certificate of trust information does not match revoked certificate data from the central database.

22 Claims, 8 Drawing Sheets

U.S. PATENT DOCUMENTS

| | | | |
|---|---|---|---|
| 6,092,196 | A | 7/2000 | Reiche |
| 6,092,199 | A | 7/2000 | Dutcher et al. |
| 6,118,874 | A | 9/2000 | Okamoto et al. |
| 6,134,592 | A | 10/2000 | Montulli |
| 6,138,159 | A | 10/2000 | Phaal |
| 6,148,404 | A | 11/2000 | Yatsukawa |
| 6,160,891 | A | 12/2000 | Al-Salqan |
| 6,226,752 | B1 | 5/2001 | Gupta et al. |
| 6,246,771 | B1 | 6/2001 | Stanton et al. |
| 6,253,325 | B1 | 6/2001 | Steele et al. |
| 6,263,432 | B1 | 7/2001 | Sasmazel et al. |
| 6,266,421 | B1 | 7/2001 | Domyo et al. |
| 6,311,275 | B1 | 10/2001 | Jin et al. |
| 6,314,425 | B1 | 11/2001 | Serbinis et al. |
| 6,363,365 | B1 | 3/2002 | Kou |
| 6,374,359 | B1 | 4/2002 | Shrader et al. |
| 6,421,781 | B1 | 7/2002 | Fox et al. |
| 6,438,600 | B1 | 8/2002 | Greenfield et al. |
| 6,463,474 | B1 | 10/2002 | Fuh et al. |
| 6,598,167 | B2 | 7/2003 | Devine et al. |
| 6,678,828 | B1 | 1/2004 | Pham et al. |
| 6,701,362 | B1 | 3/2004 | Subramonian et al. |
| 6,725,376 | B1 | 4/2004 | Sasmazel et al. |
| 6,754,349 | B1 | 6/2004 | Arthan |
| 6,760,752 | B1 | 7/2004 | Liu et al. |
| 6,823,454 | B1 | 11/2004 | Hind et al. |
| 6,931,133 | B2 | 8/2005 | Andrews et al. |
| 6,934,393 | B2 | 8/2005 | Aull |
| 6,973,571 | B2 | 12/2005 | Lee et al. |
| 6,981,156 | B1 | 12/2005 | Stern et al. |
| 7,039,946 | B1 | 5/2006 | Binding et al. |
| 7,100,049 | B2 | 8/2006 | Gasparini et al. |
| 7,127,460 | B2 | 10/2006 | Nixon et al. |
| 7,203,844 | B1 | 4/2007 | Oxford |
| 7,228,419 | B2 | 6/2007 | Iino |
| 2001/0025256 | A1 | 9/2001 | Oliphant et al. |
| 2001/0034841 | A1 | 10/2001 | Shambroom |
| 2001/0037462 | A1 | 11/2001 | Bengston |
| 2001/0045451 | A1 | 11/2001 | Tan et al. |
| 2001/0054155 | A1 | 12/2001 | Hagan et al. |
| 2002/0004773 | A1* | 1/2002 | Xu et al. .................. 705/36 |
| 2002/0029350 | A1 | 3/2002 | Cooper et al. |
| 2002/0035681 | A1 | 3/2002 | Maturana et al. |
| 2002/0071567 | A1 | 6/2002 | Kurn et al. |
| 2002/0099809 | A1 | 7/2002 | Lee |
| 2002/0112155 | A1 | 8/2002 | Martherus et al. |
| 2002/0112183 | A1 | 8/2002 | Baird, III et al. |
| 2002/0120864 | A1 | 8/2002 | Wu et al. |
| 2002/0133723 | A1 | 9/2002 | Tait |
| 2002/0147929 | A1 | 10/2002 | Rose |
| 2002/0150253 | A1 | 10/2002 | Brezak et al. |
| 2002/0152380 | A1 | 10/2002 | O'Shea et al. |
| 2002/0152393 | A1 | 10/2002 | Thoma et al. |
| 2002/0194501 | A1 | 12/2002 | Wenocur et al. |
| 2003/0093667 | A1 | 5/2003 | Dutta et al. |
| 2003/0093694 | A1 | 5/2003 | Medvinsky et al. |
| 2003/0097592 | A1* | 5/2003 | Adusumilli .................. 713/201 |
| 2003/0149880 | A1 | 8/2003 | Shamsaasef et al. |
| 2003/0154403 | A1 | 8/2003 | Keinsley et al. |
| 2003/0163691 | A1 | 8/2003 | Johnson |
| 2003/0163693 | A1 | 8/2003 | Medvinsky |
| 2003/0188193 | A1 | 10/2003 | Venkataramappa |
| 2003/0217148 | A1 | 11/2003 | Mullen et al. |
| 2003/0233336 | A1 | 12/2003 | Clark |
| 2004/0003084 | A1 | 1/2004 | Malik et al. |
| 2004/0019808 | A1 | 1/2004 | Devine et al. |
| 2004/0068665 | A1 | 4/2004 | Fox et al. |
| 2004/0103311 | A1 | 5/2004 | Barton et al. |
| 2004/0139349 | A1 | 7/2004 | Henn et al. |
| 2004/0158743 | A1 | 8/2004 | Ham et al. |
| 2004/0228493 | A1 | 11/2004 | Ma |
| 2005/0005133 | A1 | 1/2005 | Xia et al. |
| 2005/0074126 | A1 | 4/2005 | Stanko |
| 2005/0149759 | A1 | 7/2005 | Vishwanath et al. |
| 2005/0216771 | A1 | 9/2005 | Malcolm |

FOREIGN PATENT DOCUMENTS

| | | |
|---|---|---|
| WO | WO 01/77775 A2 | 10/2001 |
| WO | WO 02/33884 A2 | 4/2002 |

OTHER PUBLICATIONS

Iliadis et al., "Evaluating Certificate Status Information Mechanisms," Proceedings of the 7th ACM Conference on Computer and Communications Security, 2000, pp. 1-8, ACM Press, New York, USA.

Zheng, "Tradeoffs in Certificate Revocation Schemes," ACM SIGCOMM Computer Communication Review, Apr. 2003, pp. 103-112, vol. 33, Issue 2, ACM Press, New York, USA.

Aiello et al., "Origin Authentication in Interdomain Routing," Proceedings of the 10th ACM Conference on Computer and Communication Security, 2003, pp. 165-178, ACM Press, New York, USA.

Steiner et al., "Kerberos: An Authentication Service for Open Network Systems," USENIX Winter Conference, 1988, pp. 191-202.

Bruce, B., "Our WebWasher Workshop," downloaded by the Examiner on Sep. 9, 2006, from: wbe.archive.org, with pages dating prior to Nov. 19, 2002, downloaded pp. 1-95.

"Removing adverts from web pages," Flourish.org, published on the Web as of Oct. 3, 2002, downloaded by the Examiner on Sep. 4, 2006, from: http://web.archive.org/web/20021003023544/http://www.flouish.org/adremove, pp. 1-6.

* cited by examiner

| FIELD | VALUE |
|---|---|
| VERSION | V3 |
| SERIAL NUMBER | 4c 9b 89 ef 45 12 a6 55 dc |
| SIGNATURE ALGORITHM | md5RSA |
| ISSUER | VERISIGN CLASS 1 CA INDIVIDUAL |
| VALID FROM | SAT. 1/26/2003 4:00 PM |
| VALID TO | THURS. 9/25/2004 4:00 PM |
| SUBJECT | jdoe@microsoft.COM |
| PUBLIC KEY | RSA (1024 BITS) |
| BASIC CONSTRAINTS | SUBJECT TYPE=End Entity |
| CERTIFICATE POLICIES | [1] CERTIFICATE POLICY |
| NETSCAPE CERT TYPE | SSL CLIENT AUTHENTICATION |
| CRL DISTRIBUTION POINTS | http://www.crlserver.com/class1.crl |
| THUMBPRINT ALGORITHM | sha1 |
| THUMBPRINT | 2c ae b9 b1 4b d9 8b 9b 18 53 |

PUBLIC KEY INFRASTRUCTURE SCALABILITY CERTIFICATE REVOCATION STATUS VALIDATION

TECHNICAL FIELD

The present invention relates to the field of computer network environments. In particular, this invention relates to a system and method for maintaining certificate of trust information from various sources in a central database to reduce network traffic and improve a user's experiences during a certificate validation process.

BACKGROUND OF THE INVENTION

Web services, or Internet sites, very often provide information, products, services, and the like to their users. But a major concern to users and web services alike has been the security of the Internet, especially when transmitting sensitive information. Information security is often provided to users and/or web services through an encryption process. Encryption involves digitally signing, or encoding, information in such a way that only the person (or computer) with a key can decode it. Digitally signing data is commonly accomplished through the use of Public-key encryption. Public-key encryption uses a combination of a private key and a public key. In public key encryption, a particular originating computer that will transmit information to a remote computer knows both the private key and public key. The originating computer utilizes the public and private keys in a mathematical operation performed on the information to produce an encrypted message. The originating computer also provides the public key to the remote computer, but the private key remains private (i.e., secret) to the originating computer. To decode an encrypted message, the remote computer must use the public key, provided from the originating computer, and its own private key. If the data was modified, or the data was encrypted with a different private key, then the original data and the data calculated by the recipient will be different. This ensures that the data was not modified during transmission and that it originates from the true sender. A popular implementation of public-key encryption is the Secure Sockets Layer (SSL). SSL is an Internet security protocol used by Internet browsers and Servers to transmit sensitive information. SSL recently became part of an overall security protocol known as Transport Layer Security (TLS).

This Public Key Infrastructure (PKI) enables users of an unsecured public network, such as the Internet, to securely and privately exchange data, communication and/or currency over the network. An essential component of PKI is a digital certificate (certificate). The certificate is basically a bit of information that says that a particular computer or web server is trusted by an independent source known as a certificate authority. The certificate authority acts as an intermediary between both computers, and can confirm that each computer is in fact who it claims to be, and notarizes the public keys of each computer to the other. By signing the public key, the certificate authority asserts the identity of the subject/computer, the public key, and characteristics belonging to the subject/computer. The public key mathematically binds the certificate to its bearer, or to be exact, to the bearer's private or secret key. With certificates, it is possible to check the chain of trust that relates to the certificate and the public key, and through the certificate status checking mechanism to make sure the secret known only by the certificate bearer (i.e., private key) has not leaked.

In PKI, the status of certificates should be validated or authenticated before they are used. The status of a particular certificate can be determined by examining a certificate revocation list (CRL) that identifies certificates with a revoked status (i.e., certificates that are no longer trusted). The certificate authority that issues the certificate often publishes CRLs on, for example, a CRL server, and the issued certificate may include data specifying a Uniform Resource Locator (URL) identifying the address of the CRL server on the network. During an authentication process, an authentication server communicates with the CRL server identified by the URL and downloads the CRL to check the revocation status of the certificate.

Revocation status checking is often a client operation. For example, in today's SSL/TLS, clients like home users' machines often check the revocation status of a server's certificate during the SSL negotiation process. Unfortunately, CRL servers can receive a large number of download requests when significant numbers of clients have CRL checking enabled. Under such loads, the CRL server could fail to timely provide the requested CRL information. The failure to respond to a request in a timely manner often results in a network timeout on the client side. Accordingly, a system for validating the certificate revocation status is desired to address one or more of these and other disadvantages.

SUMMARY OF THE INVENTION

The present invention relates to an improved authentication service. In particular, the invention involves employing one or more fetching servers to periodically download revoked certificate data from a certificate authority for storage in a central database. The invention provides an authentication system that checks the central database to determine the revocation status of a particular certificate associated with a client request. By maintaining revoked certificate data in the central databases, and decoupling the revocation status checking from the revoked certificate data fetching, network traffic is greatly minimized, and, thus, latency in the execution of applications can be significantly reduced. In addition, it ensures that all servers comprising the authentication system use a single set of CRLs. In accordance with one aspect of the invention, a method is provided for validating a user certificate received from a user requesting access to a secure web service. The user certificate includes user certificate data. The method includes retrieving revoked certificate data from a plurality of certificate issuers. The revoked certificate data identifies one or more revoked certificates. The method further includes storing the revoked certificate data in a central location. The method also includes receiving a request from a user for access to the web service. The request includes a user certificate. The method further includes comparing user certificate data included in the user certificate to revoked certificate data stored in the central location. The method further includes selectively authenticating the user as a function of the comparison, and signature verification using the public key in the certificate, and providing the user access to the requested web service when the user is authenticated.

In accordance with another aspect of the invention, a method is provided for adding additional revoked certificate data from a plurality of certificate issuers to revoked certificate data stored in a central location. The stored revoked certificate data identifies one or more certificate issuers that publish revoked certificate data for revoked certificates. The method includes retrieving the stored revoked certificate data from the central location. The method further includes determining an update time for each of the one or more certificate issuers from the retrieved revoked certificate data. The update times each specify a time updated revoked certificate data is published by each of the one or more certificate issuer. The method further includes organizing the retrieved revoked certificate data in a sequence according to the determined update time for each of the one or more of certificate issuers. The method also includes identifying an address of each of the one or more certificate issuers from the retrieved revoked certificate data, and retrieving additional revoked certificate data from the identified addresses according to update times in the organized sequence.

In accordance with another aspect of the invention, a system is provided for retrieving revoked certificate data in response to a client request. The client request requests access to a secure web service and the client request includes user certificate data. The system includes a central database. The system further includes a fetching server for retrieving revoked certificate data from a plurality of certificate authority servers for storage in the central database. The revoked certificate data identifies one or more revoked certificates. The system further includes an authentication server responsive to the client request for executing a certificate revocation provider component. The certificate revocation provider component loads the revoked certificate data in the central database into a memory associated with the authentication server. The certificate revocation provider component is responsive to the client request and loaded revoked certificate data to determine if the client request is authentic.

In accordance with another aspect of the invention, a system is provided for managing certificate revocation status data. The system includes a fetching server for identifying a list of addresses corresponding to a plurality of certificate issuers. The fetching server retrieve revoked certificate status data from a content server corresponding to the list of addresses. The system further includes a central database responsive to the retrieved revoked certificate status data for storing a list of revoked certificates.

In accordance with another aspect of the invention, a computer-readable medium having computer-executable instructions for authenticating a user requesting access to a web service is provided. Retrieving instructions retrieve revoked certificate data from a plurality of certificate issuers. The revoked certificate data identifies one or more revoked certificates. Storing instructions store revoked certificate data for each of the identified one or more revoked certificates in a central location. Receiving instructions receive a request from a user for access to the web service. The request includes a user certificate having user certificate data. Comparing instructions compare the user certificate data to the revoked certificate data stored in the central location. Authenticating instructions selectively authenticate the user as a function of the comparison and using the public key in the certificate to verify a signature that was made using the associated private key. Providing instructions providing the user access to the requested web service when the user is authenticated.

In accordance with another aspect of the invention, a computer-readable medium having computer-executable instructions for adding additional revoked certificate data to revoked certificate data stored in a central location is provided. The stored revoked certificate data identifies one or more certificate issuers that publish revoked certificate data for a plurality of revoked certificates. Retrieving instructions retrieve the stored revoked certificate data from the central location. Determining instructions determine an update time for each of the one or more certificate issuers from the retrieved revoked certificate data. The update times each specify a time updated revoked certificate data is published by each of the one or more certificate issuers. Organizing instructions organize the retrieved revoked certificate data in a sequence according to the determined update time for each of the plurality of certificate issuers. Identifying instructions identify an address of each of the one or more certificate issuers from the organized revoked certificate data. Retrieving instructions retrieving additional revoked certificate data from the identified addresses according to update times in the organized sequence.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
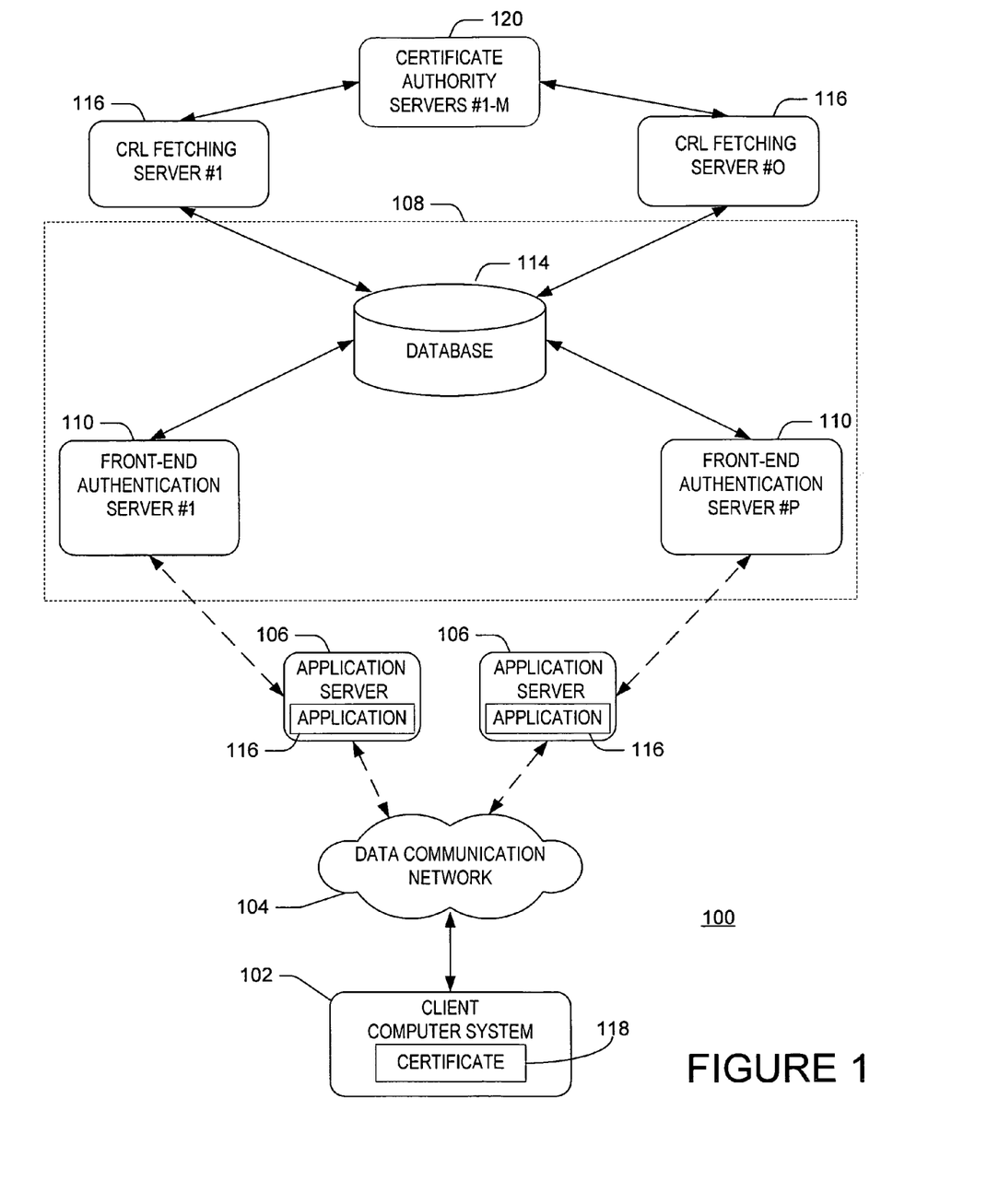
FIG. 1 is a block diagram illustrating an exemplary network environment in which the invention can be utilized.

FIG. 1 shows an exemplary network environment 100 in which the invention can be utilized. A client computer system 102 is coupled to a data communication network 104, for example, the Internet (or the World Wide Web). Application servers 106 (e.g., web servers or network servers) are coupled to network 104 to facilitate communication between servers 106 and the client computer system 102. The client computer system 102 employs the network 104 and servers 106 to access an authentication network 108 including, for example, front-end servers 110 (e.g., authentication servers) and a database 114. The client 102 and servers 106, 110, communicate using a protocol such as the Hypertext Transfer Protocol (HTTP), a protocol commonly used on the Internet to exchange information. As a result, the client computer system 102 can request access to one or more applications 116 provided by the one or more application servers 106 via the network 104. However, prior to allowing the client 102 access to the requested application 116, the application server 106 may redirect the client's request to the authentication network 108 to authenticate the client 102 and verify that the client 102 can access the application 116. In this instance, the authentication server 110 communicates with the client 102 to collect authentication information (e.g., username, password) from the user of the client computer system 102, and to validate a certificate 118 associated with a particular user identified from the client request. Typically, the certificate 118 is stored on the client 102, and is submitted to the authentication server 110 when the user request access to a secure application 116. As described in more detail below, each certificate 118 includes certificate data, or trust data, concerning the trustworthiness of the particular user requesting access to the application.

The submitted certificate is only part of the data. For example, during authentication, the client 102 needs to prove to the authentication server 110 that it possesses the private key. Theoretically, the client need not support the certificate in its entirety; just the identifying characteristics would suffice (e.g., CA/serial number, Subject Key Identifier, or thumbprint of the certificate.) That is, the client provides evidence of private key possession by signing some data and advises the authentication server of the matching public key to use for verifying the signature. In this case, the certificate is also submitted in this application because the TLS/SSL client authentication is used. A database 114 is coupled to the front-end servers 106, and contains, for example, revoked certificate data necessary to validate the trustworthiness of the certificate associated with the user. One or more fetching servers 116 periodically download certificate revocation list (CRL) information (i.e., revoked certificates) from a certificate authority 120, for storage in database 114. The certificate authority issues signed certificates that are used to authenticate both sites and users. For example, one such certificate authority is VeriSign® owned by VeriSign, Inc. located in Dulles, Va. The CRL identifies certificates that have a revoked status, and, thus, are considered untrustworthy by the certificate authority that issued the certificate 118. The front-end servers 110 are responsive to client requests to retrieve revoked certificate data from the database and compare the retrieved revoked certificate data to the user certificate data. If user certificate data does match revoked certificate data in the database 114, the request will fail. For example, if a serial number issued by a certificate authority and included in the revoked certificate data matches the serial number of the certificate received from the client, the request fails. If the user certificate data does not match revoked certificate data listed in database 114, or if the user certificate has not expired, it is deemed valid, and the authentication server allows the client to access the requested application.

Figure 2:
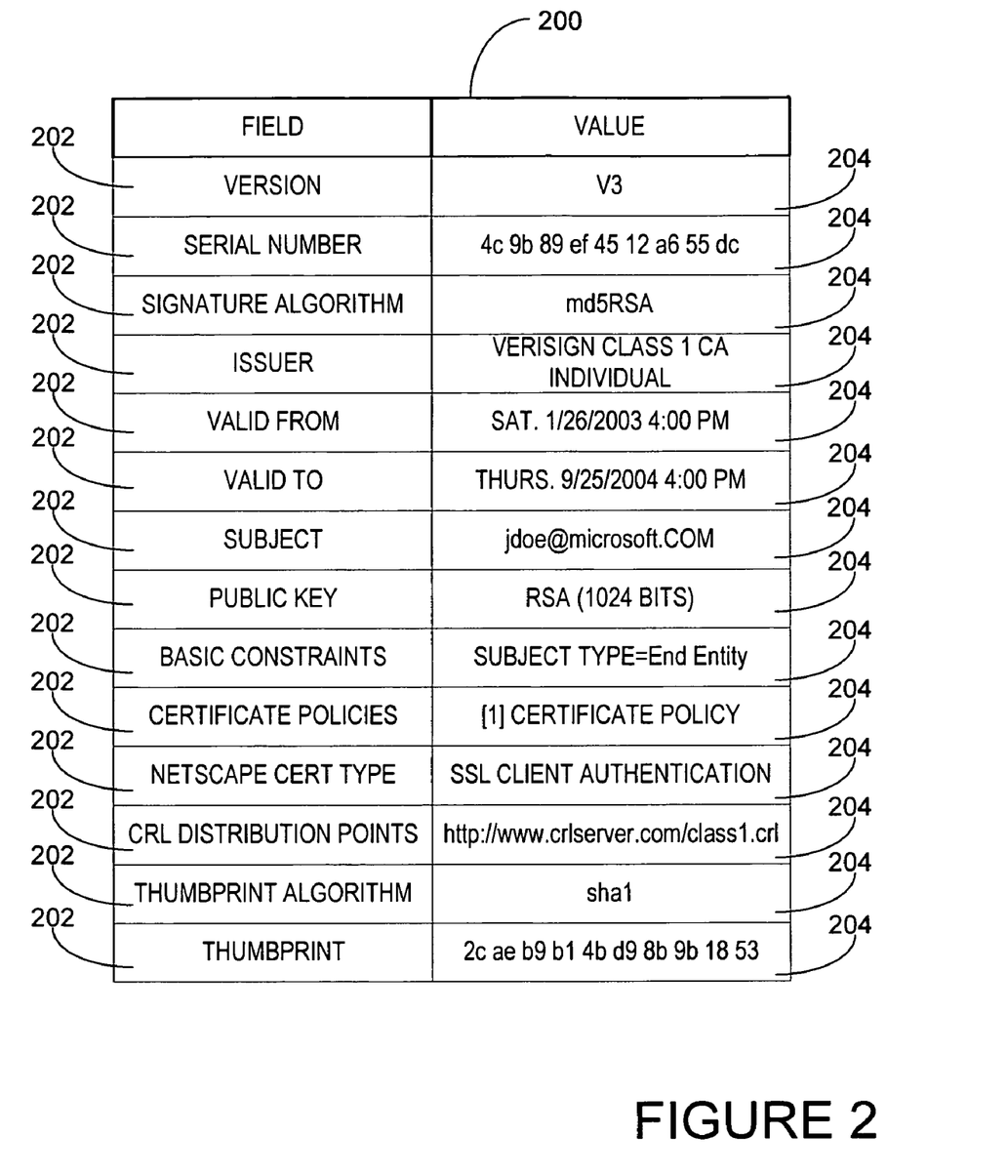
FIG. 2 is a block diagram illustrating data components of an exemplary certificate.

Referring next to 202, a block diagram illustrates components of an exemplary certificate 200 (e.g. certificate 118). The certificate 200 has various fields 202 having corresponding value data 204. In this example, the certificate 200 includes value data 204 for the following fields 202: version; serial number; signature algorithm; issuer; valid from; valid to; subject; public key basic constraints; certificate policies; Cert type, CRL Distribution point; thumb print algorithm; and thumb print.

The version field identifies the version of the encoded certificate. The serial number field specifies does the certificate authority to each certificate assign a positive integer. It must be unique for each certificate issued by a given certificate authority (i.e., the issuer name and serial number identify a unique certificate). The signature algorithm field identifies the algorithm used by the certificate authority to sign the certificate. The issuer field identifies to the entity that signed and issued the certificate. The valid from field identifies the beginning of a time period during which the certificate is valid. The valid to field identifies the end of a time period during which the certificate is valid. The subject filed identifies the entity (e.g., a certificate authority) associated with the public key stored in the subject public key field. The public key basic constraints field identifies whether the subject of the certificate is a certificate authority and the maximum depth of valid certification paths that include this certificate. The certificate policies field contains a sequence of one or more policy information terms, each of which consists of an object identifier (OID) and optional qualifiers. In an end entity certificate, these policy information terms indicate the policy under which the certificate has been issued and the purposes for which the certificate may be used. In a certificate authority certificate, these policy information terms limit the set of policies for certification paths that include this certificate. The certificate (cert) type filed identifies the type of certificate keying materials that are desired (e.g., signature, key exchange, Certificate Revocation List, etc.). The CRL distribution point field identifies the location where CRL information can be obtained. The thumbprint field identifies a hash calculated of the whole certificate (including the CA signature and other data). The thumb print algorithm filed identifies is the algorithm (e.g., a SHA1 algorithm) used to calculate the unique certificate thumbprint. For example, the serial number field in certificate 200 has the unique alphanumeric value "4c 9b 89 ef 45 12 a6 55 25 dc." As another example, the CRL Distribution Point field specifies a Uniform Resource Locator (URL) that identifies the location of a server maintaining a CRL. In this example, the corresponding value data indicates the URL is "http://www.crlserver.com/class1.crl."

Referring now to Table 1, the data included in an exemplary CRL is shown.

TABLE 1

| | C1<br>Serial Number | C2<br>Revocation date | C3<br>CRL Update |
|---|---|---|---|
| 1 | 4c 9b 89 ef 45 12 a6 55 dc | Sep. 25, 2003 | Jan. 25, 2004 |
| 2 | 4g 7b 87 ef 41 12 a4 55 dc | Jan. 1, 2004 | Feb. 20, 2004 |
| 3 | 3g 8b 87 ef 45 13 a2 58 dc | Dec. 31, 2003 | Feb. 20, 2004 |
| 4 | 3d 5b 87 ef 45 13 a2 53 dc | Feb. 20, 2004 | Jan. 25, 2004 |
| 5 | 3c 9b 87 ef 48 11 a2 53 dc | Dec. 31, 2003 | Jan. 25, 2004 |

As described above in reference to FIG. 1, the CRL includes certificate data for one or more revoked certificates. Each of the columns (C1- C3) corresponds to the value of various fields of a particular revoked certificate. Each of the rows (R1-R5) corresponds to a particular revoked certificate. In this instance, the CRL includes the following revoked certificate data: serial number, revocation date, and next update date. The revocation date is the date the certificate expired, and corresponds to the value of the "valid to" field. For example, referring again to FIG. 2, the value data that corresponds "valid to" field specifies Thursday, Sep. 25, 2003. Thus, the certificate 200 included in the CRL has a specified revocation time of Sep. 25, 2003 (i.e., see cell located at R1 and C2 in Table 1; hereinafter referred to as R1C2). The next update time specifies a time at which CRL information (i.e., revoked certificate data) from a particular CRL sever will be updated. The specified time is used to determine when the CRL is considered obsolete and a new one should be fetched. In other words, it is the latest time that a relying party can use this CRL without picking up any refresh. The certificate authority could, however, publish before the next update time. Although Table 1 shows three data categories, it is contemplated that the CRL may include a plurality of other data categories.

Figure 3:
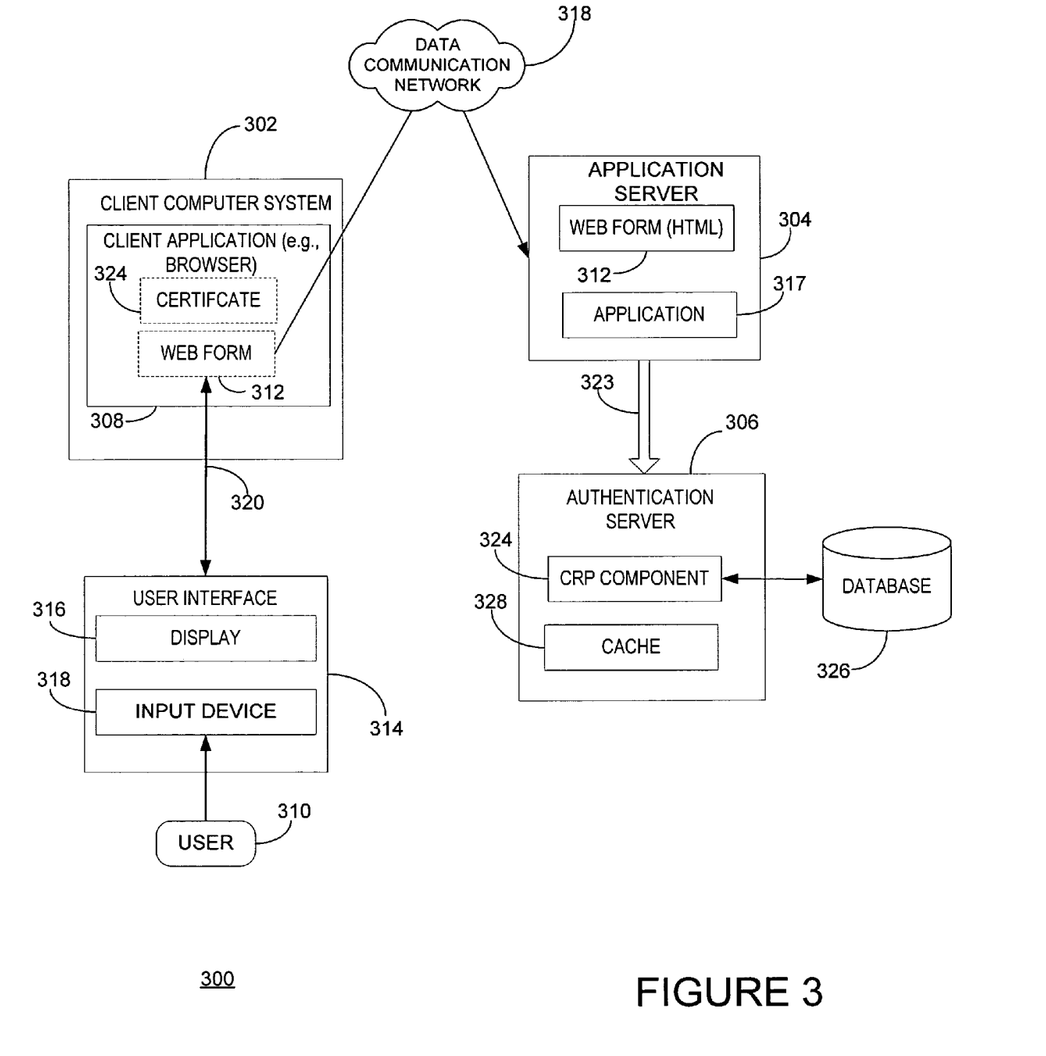
FIG. 3 is block diagram illustrating components of an authentication server according to one embodiment of the invention.

Referring next to FIG. 3, an exemplary block diagram illustrates components of a client 302 (e.g., client computer system 102), application server 304 (e.g., server 106) and an authentication server 306 (e.g., server 110) according to one embodiment of the invention. A client application 308 allows a user 310 to retrieve HTML documents such as a web page or web form 312 from the application server via a communication network 314 (e.g., network 104). The client application 308 is executable by the client 302, and responsive to user 310 inputs for initiating the retrieval of such HTML documents (web form) 312. One skilled in the art will appreciate that client application 308 may be any commercially available web browser (e.g., Internet Explorer® browser offered by Microsoft Corporation). Frequently, the user 310 uses the client application 308 to contact a web site to retrieve a web form 312 accepting input data from the user 310.

A user-interface (UI) 314 linked to the client 302 allows user 310 to interact with the retrieved web form 312. For example, the UI 314 may include a display 316 such as a computer monitor for viewing the web form 312 and an input device 318 such as a keyboard or a pointing device (e.g., a mouse, trackball, pen, or touch pad) for entering data into the web form 312. In other words, UI 314 allows user 310 to interact with the web form 312 to define an input data stream, as indicated by reference character 320.

Referring further to FIG. 3, the application server 304 receives a request including a user certificate and user certificate data from the client 302 via client application 308 and communication network 318 to access a web application 317. In this case, the web application 317, is responsive to the request received from the client 302, and executable by application server 304, for redirecting the request, as indicated by arrow 323, to the authentication server 306 (i.e., server 110) to verify the requesting user 310 and/or client 302 is authorized to access the web application 322. For example, the application server 304 receives a request from the client 302. The application server 304 on not finding evidence of user authentication (i.e., user is not logged in or presence of a "ticket") uses HTTP redirects to get the client 302 to authenticate to the authentication server 306. Once the authentication is completed, the authentication server 306, again using HTTP redirects, gets the client 302 to resume its request to the application server 304. After the user 310 and/or client 302 are verified to have authority to access web application 322, the web application 322 returns data back to client 302 via the client application 308.

The authentication server 306 is responsive to the redirected request for executing a Certificate Revocation Provider (CRP) component 324 to validate that the user has the private key for a certificate 325 that the user 310 can use for authentication. To do this, the client 302 submits the signature using the private key and the certificate that holds the matching private key. One way this can be done is with SSL client authentication. The CRP component 324 retrieves information regarding the status of a user certificate 325 included in the request and received from the client 302. More specifically, the CRP component 324 retrieves revoked certificate data from a central database 326 (i.e., database 114), linked to the authentication server 306, to determine if the user certificate 325 has been revoked.

In one embodiment, after the revoked certificate data is retrieved from the central database 326, the CRP component 324 stores the retrieved revoked certificate data in a cache 328 associated with the authentication server 306 such that the CRP component 324 can readily determine if certificates associated with future client requests are revoked. If data included in the user certificate 326 does not match revoked certificate data in the database 326, the user certificate 326 is deemed valid, and the CRP component 324 allows the client to access the requested application. Even if revoked certificate data for the user certificate is not listed in the database, the CRP component 324 parses the data included in the user certificate 325 to identify the CDP (e.g., URL address), and stores the identified CDP in the database 326 for subsequent retrieval by fetching servers. As described in more detail below, the revoked certificate data stored in database 326 is retrieved and/or updated by fetching servers, and the identified CDP is used by the fetching servers for retrieving updated and/or new revoked certificate data for storage in the central database 326.

Figure 4:
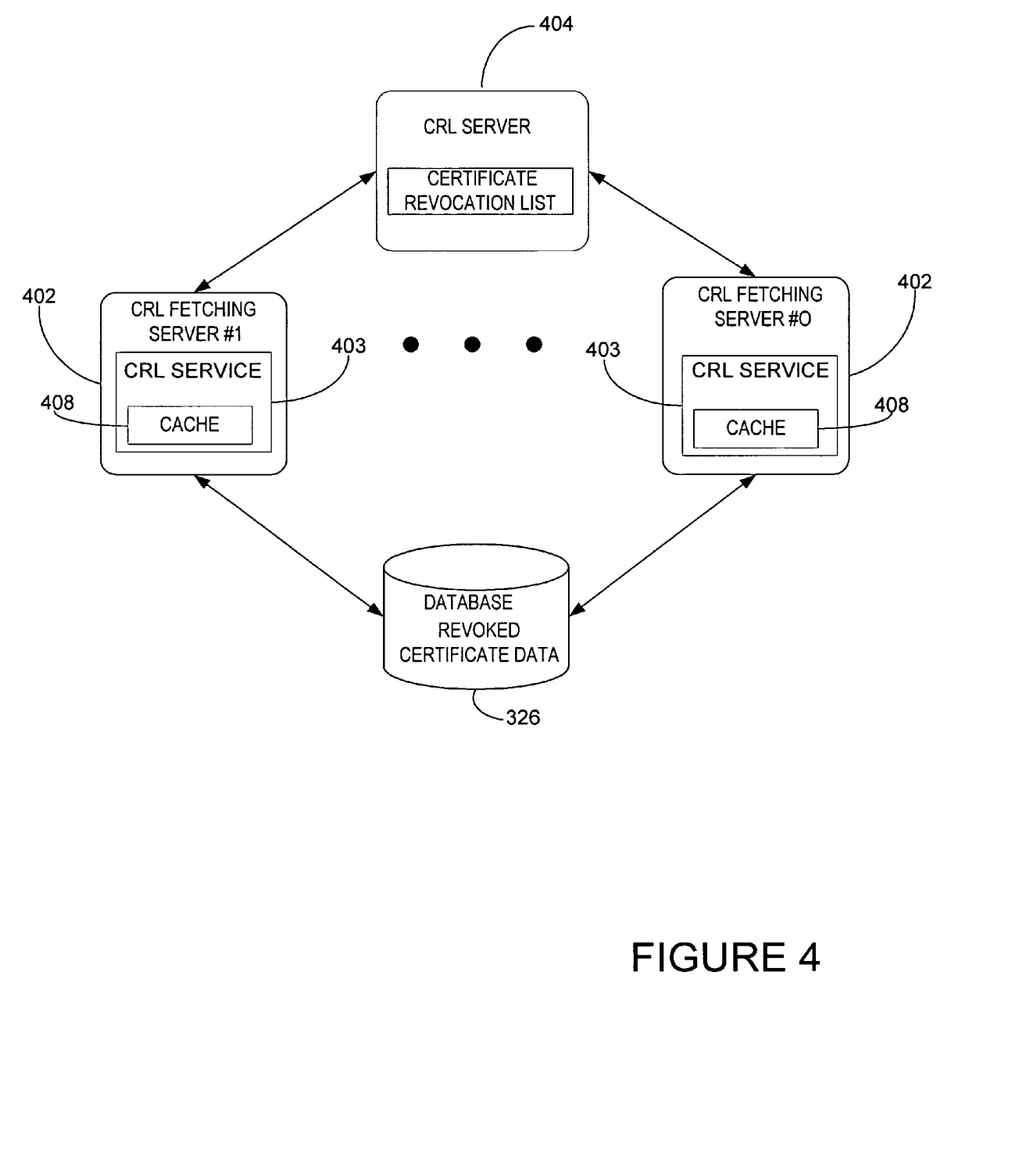
FIG. 4 is a block diagram illustrating components of a fetching server according to one embodiment of the invention.

Referring now to FIG. 4, an exemplary block diagram illustrates components of a fetching server 402 for retrieving revoked certificate data for certificates having a revoked status from a CRL server 404 (e.g., certificate authority servers 120) for storage in the central database 326 according to one embodiment of the invention. In one such embodiment, the fetching server 402 executes a Certificate Retrieval List (CRL) service 403 to retrieve a certificate revocation list (CRL) from one or more CRL servers 404 The CRL includes revoked certificate data identifying certificates with a revoked status (i.e., certificates that are no longer trusted). As described above in reference to FIG. 2, each certificate includes certificate data. In this case, the retrieved revoked certificate data (i.e., CRL) includes revoked certificate serial numbers. Moreover, as described above in reference to FIG. 2, certificates issued by the certificate authority may include data (i.e., CDP point) that specifies the name and address of a CRL server 404 on which particular CRL information (i.e., revoked certificate data) resides.

In one embodiment, the CRL service 403 contacts one or more of CRL servers 404 at a predetermined interval to retrieve revoked certificate data for storage in the database 326. For example, the CRL service 403 contacts each of the one or more CRL servers 404 once a week to retrieve updated revoked certificate data. In another embodiment, the CRL service 403 parses the revoked certificate data stored in the database to determine a time to retrieve new or updated revoked certificate data from the one or more CRL servers 404. For instance, referring again to Table 1, the CRL service 403 parses the next update fields in the database 326 to identify the next update times for revoked certificate data, and retrieves new or updated revoked certificate data from the one or more CRL servers 404 at the identified next update times. In one embodiment, the CRL service 403 maintains a fetching table in a second cache 408 associated with the fetching server 402. The fetching table specifies a sequence for retrieving revoked certificate data from CRL servers 404. In particular, the CRL service 403 organizes CDP data retrieved from the database 326 in chronological order based on identified update times from the retrieved revoked certificate data. For example, from the revoked certificate data shown in Table 1, the CDP for each of the revoked certificates can be listed in chronological order as shown below in Table 2. In one preferred embodiment, the fetching table includes only the data as listed in columns C3 (i.e., CDP) and column C4 (i.e., next update time) of Table 2. At the identified next update time, the CRL service 403 contacts the CRL server 404 at the URL listed in the fetching table, and retrieves the latest CRL information for storage in the database 326.

TABLE 2

| | C1<br>Serial Number | C2<br>Revocation<br>Date | C3<br>CDP | C4<br>CRL<br>Update |
|---|---|---|---|---|
| 1 | 4c 9b 89 ef 45 12 a6 55 dc | Sep. 25, 2003 | www.crlserver.com/class1 | Jan. 25, 2004 |
| 2 | 3d 5b 87 ef 45 13 a2 53 dc | Feb. 20, 2004 | www.crlserver.com/class1 | Jan. 25, 2004 |
| 3 | 3c 9b 87 ef 48 11 a2 53 dc | Dec. 31, 2003 | www.crlserver.com/class1 | Jan. 25, 2004 |
| 4 | 3g 8b 87 ef 45 13 a2 58 dc | Dec. 31, 2003 | www.crlserver2.com/class1 | Feb. 20, 2004 |
| 5 | 4g 7b 87 ef 41 12 a4 55 dc | Jan. 1, 2004 | www.crlserver2.com/class1 | Feb. 20, 2004 |

In another embodiment, the CRL service 403 parses the CDP field of the revoked certificate data in the database 326 and compares the CDP data from the database 326 to URL data of revoked certificates previously listed in the fetching table. If the CDP data from the database 326 includes URLs not listed in the fetching table, the CRL service contacts the CRL server 404 at the location identified by the CDP data to retrieve the new revoked certificate data for storage in the database 326.

Figure 5:
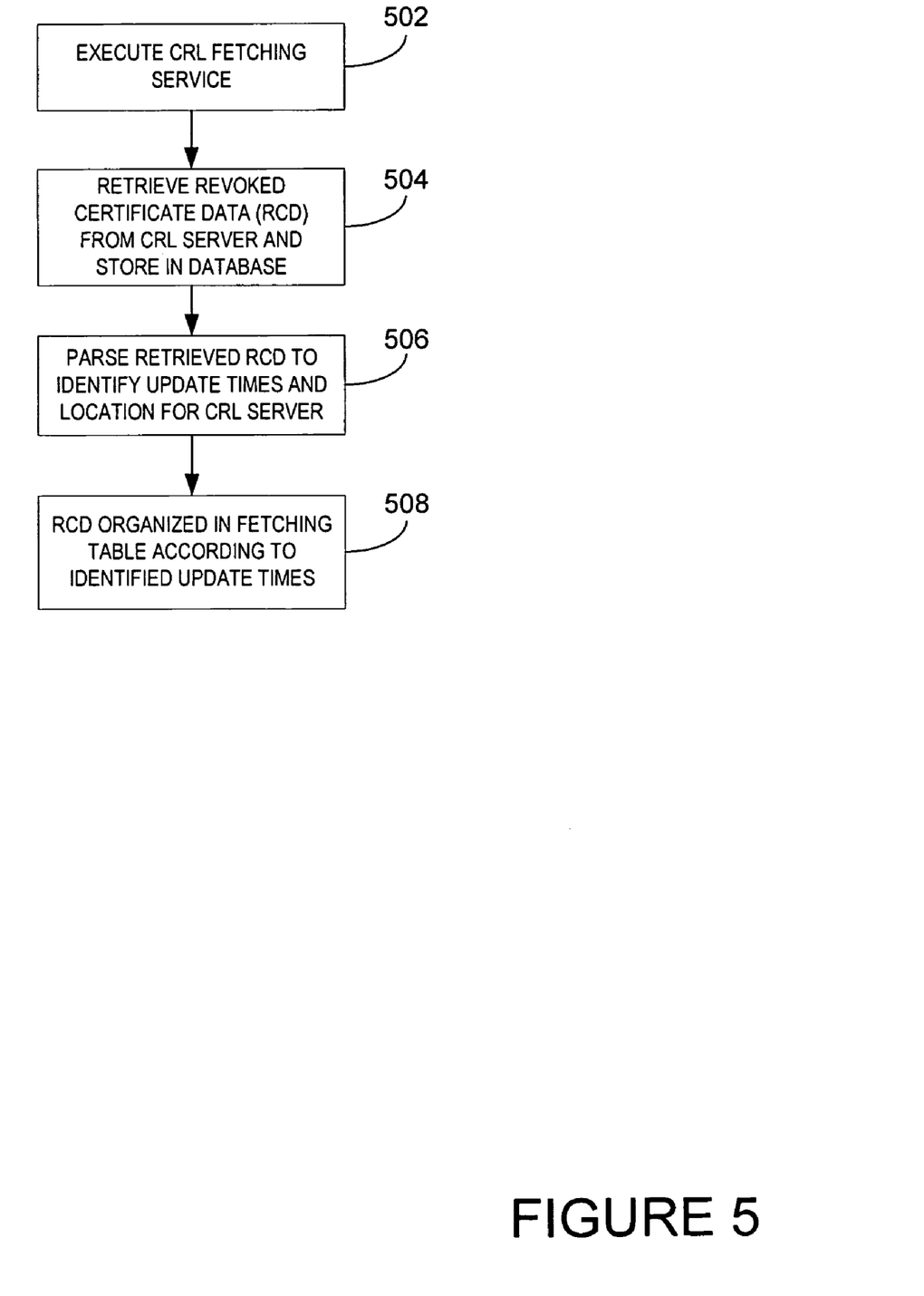
FIG. 5 is a flow chart illustrating a method for retrieving revoked certificate data according to exemplary embodiment illustrated in FIG. 4.

Referring now to FIG. 5, an exemplary flow chart illustrates a method for retrieving revoked certificate data for storage in a central location according to the embodiment illustrated in FIG. 4. At 502, the fetching server 402 executes a CRL service 403 during an initialization process and/or refresh process and identifies a CRL server 404 from which to retrieve revoked certificate data. For example, the URL for the CRL of a certificate is specified in the certificate as the CDP attribute. When the CDP (e.g., URL) for a particular certificate is not found in the database, the CDP entry for that particular certificate is added to the database. Revoked certificate data is retrieved from the identified URL of the CRL server 402 and stored in the central database at 504. At 506, the revoked certificate data stored in the database is parsed to identify update times and URL information. The revoked certificate data is organized in a fetching sequence within a fetching table maintained in a memory (e.g., cache 408) associated with the fetching server 508. For example, the URL information (i.e., CDP) is organized in chronological order in the fetching table based on the identified update times.

Figure 6:
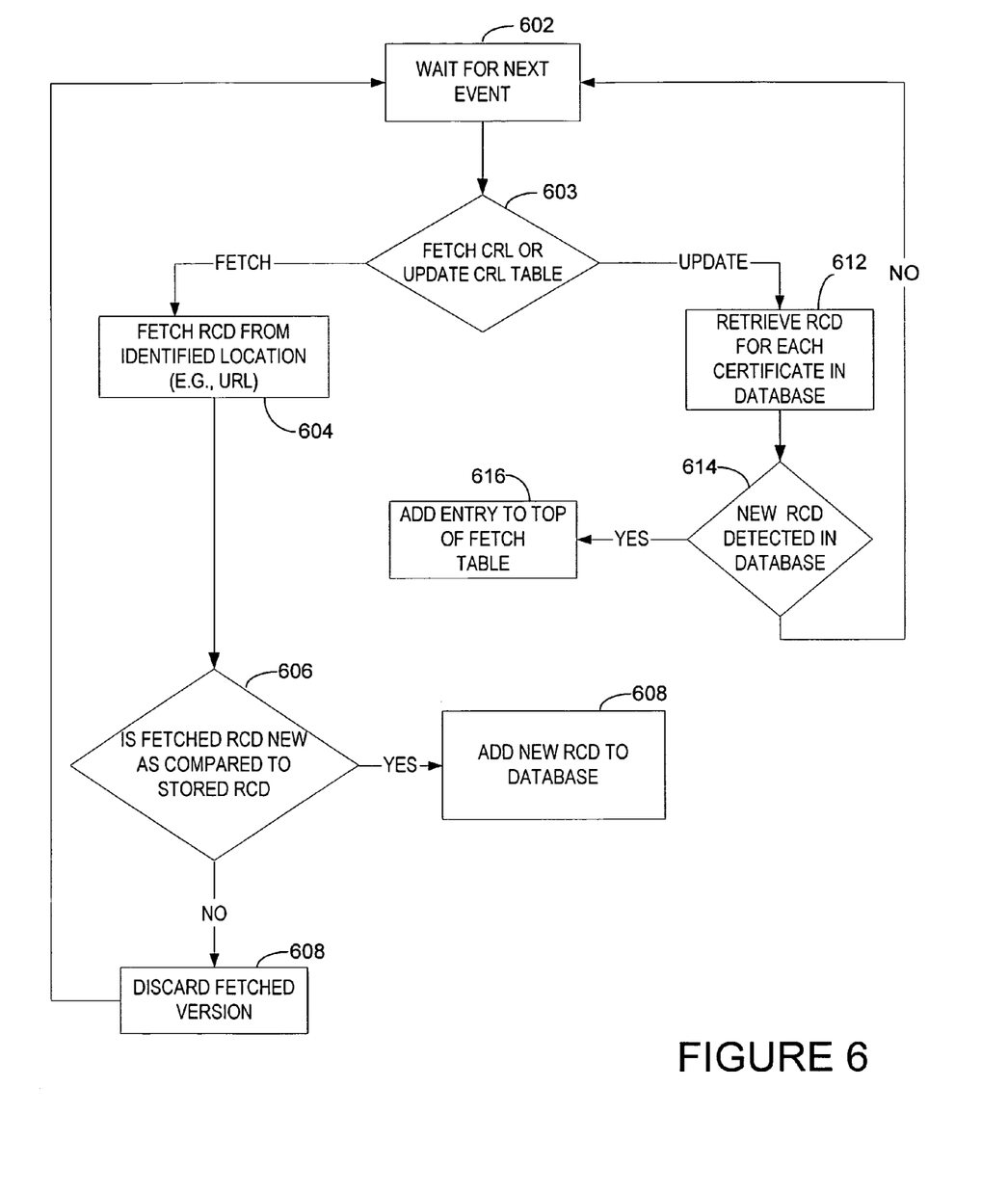
FIG. 6 is a flow chart illustrating a method for managing revoked certificate data stored in central database according to exemplary embodiment illustrated in FIG. 4.

Referring now to FIG. 6, an exemplary flow chart illustrates a method of managing revoked certificate data stored in the central database according to the embodiment illustrated in FIG. 4. At 602, the CRL service 403 waits for an event to be detected. Events may include, for example, a new CRL entry detected in the central database 326, the current time equals a next update time listed in the fetching table (See Table 2), or shutdown of server 402. The CRL service 403 determines if a detected event requires fetching revoked certificate data listed in the fetching table, or requires updating the revoked certificate data listed in the fetching table at 603. For instance, when the current time is the same as a next update time listed in the fetching table for a particular CRL server, updated revoked certificate data is fetched from the CRL server for storage in the database 326. As another example, if new CDP data is detected in the database 326, the fetching table is updated to include the new revoked certificate data.

If the CRL service 403 determines to fetch CRL information at 603, the fetching server 402 contacts the CRL server 404 at the identified URL and retrieves revoked certificate data at 604. At 606, the revoked certificate data retrieved from the CRL server 404 is compared to the revoked certificate data stored in the database to determine if the retrieved revoked certificate data corresponds to an updated version of revoked certificate data For example, a stored CRL version number associated with stored revoked certificate data is compared to a retrieved CRL version number associated with the retrieved revoked certificate data to determine if the retrieved CRL number corresponds to the latest version of revoked certificate data. If the retrieved CRL version number is determined to correspond to the latest version, or newer version, of revoked certificate data at 606, the revoked certificate data stored in the database 326 is replaced with the retrieved revoked certificate data at 608. If the retrieved CRL version number does not correspond to new version of revoked certificate data at 606, the retrieved revoked certificate data at 610 is discarded, and the CRL service 403 awaits the next event at 602. If the CRL service 403 determines to update revoked certificate data listed in the fetching table at 603, revoked certificate data is retrieved for each of the certificates in the database at 612. The revoked certificate data retrieved from database 326 is compared to the revoked certificate data in the fetching table to determine if the database contains new revoked certificate data at 614. In other words, CRL service 403 determines if the database 326 contains any revoked certificate data that was not contained in the fetching table. If new revoked certificate data is detected at 614, the revoked certificate data is assigned to the top of the fetching sequence in the fetching table at 616. If no new revoked certificate data is detected at 616, CRL service awaits the next event at 602.

Figure 7:
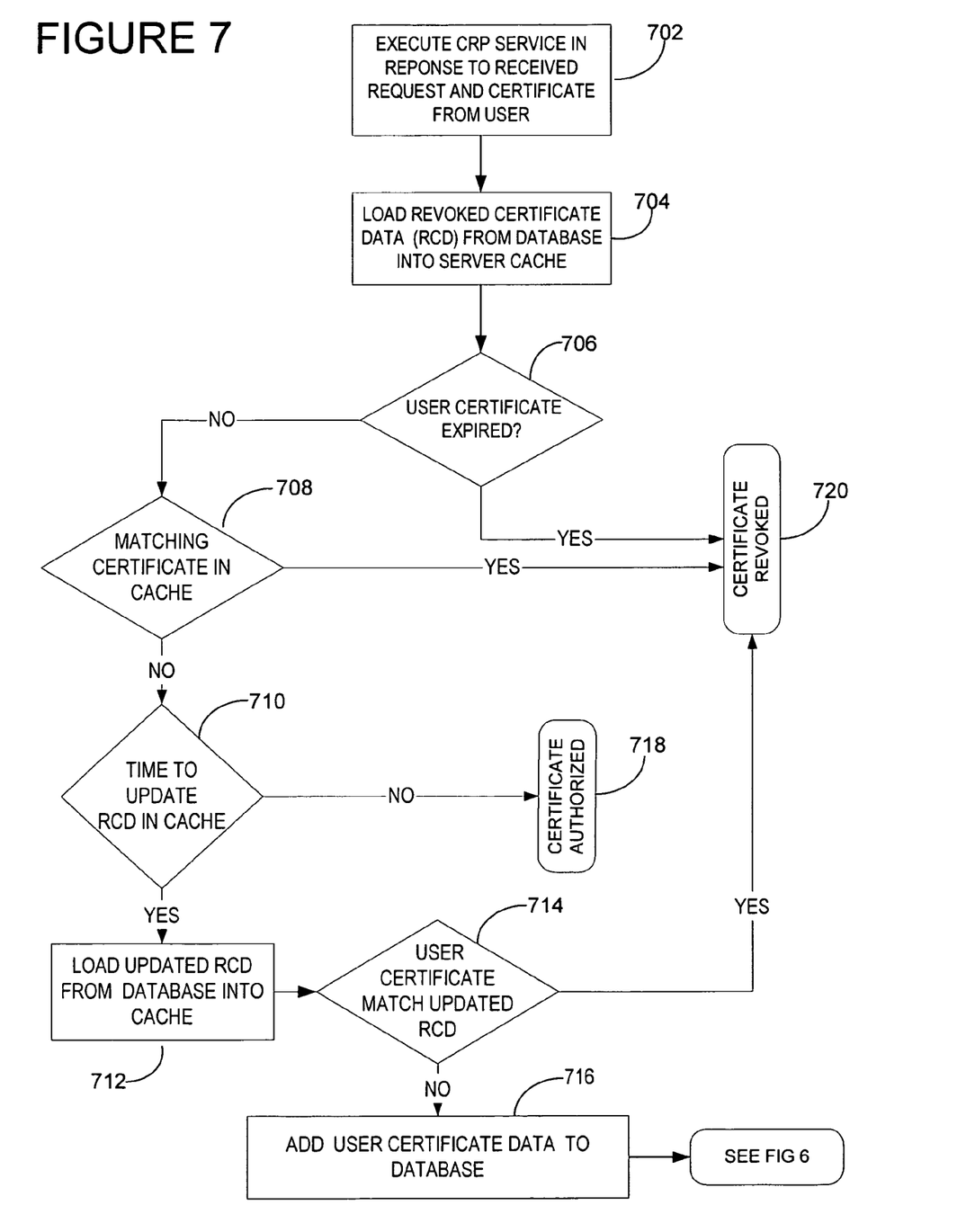
FIG. 7 is a flow chart illustrating a method of authenticating a client request for access to a web application according to the exemplary embodiment illustrated in FIG. 3.

Referring now to FIG. 7, an exemplary flow chart illustrates a method of authenticating a client request for access to a web application according to the exemplary embodiment illustrated in FIG. 3. At 702, the authentication server 306 receives a request and certificate 325 from a user 322 requesting access to a secure web application, and executes a CRP component 324. The CRP component 324 loads revoked certificate data from the database 326 into a memory (e.g., cache 328) associated with the authentication server 306 at 704. In this case, the retrieved revoked certificate data is based on the CDP in the cert. At 706, the CRP component parses the user certificate 325 and determines if the certificate 325 is expired. If the certificate is not expired at 706, the CRP component 325 searches the revoked certificate data stored in the memory to determine if data included in the user certificate matches the revoked certificate data at 708. For example, the CRP component searches the revoked certificate data stored in the cache of the authentication server for a serial number that matches the serial number of the certificate received from the client. If a matching certificate is not found at 708, the CRP component determines if it is time for the revoked certificate data stored in the memory cache to be updated 710 For example, the CRP component determines if an update time included in the revoked certificate data has transpired. If the update time has transpired at 710, the CRP component loads updated revoked certificate data from the databases 326 in to the memory cache 328 at 712. At 714, CRP component determines if the received certificate matches the updated revoked certificate data. If data included in the user certificate does not match the updated revoked certificate data at 714, the CRP component stores data included in the user certificate in the database at 716. In particular, if the CDP is not found in the database the CRP component stores the CDP identified by user certificate data in the database. As described above in reference to the FIG. 6, this results in the CRL service detecting an event, and the CRL service places the CDP in the fetching table and contacts the CRL server identified from the CDP data to retrieved the latest revoked certificate data for storage in the database. If the certificate is not expired at 706, and it does not match the updated revoked certificate data in the cache at 714, the certificate is deemed to be valid and the CRP component allows the user to access the requested application at 718. If the certificate is expired at 706, or a matching certificate is found at 710 or 714, the certificate is deemed revoked, and the CRP component denies the user access to the requested application at 720.

Figure 8:
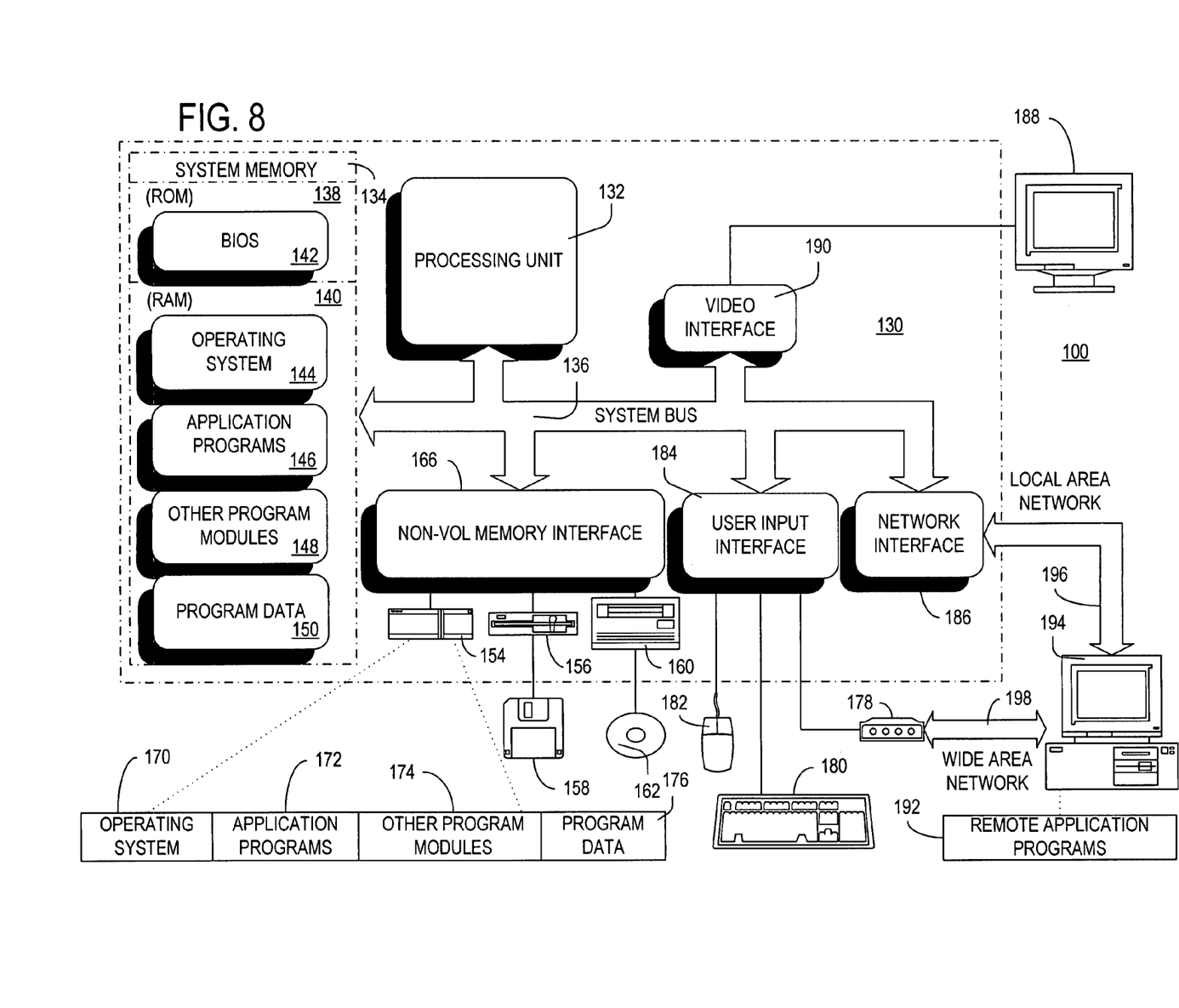
FIG. 8 shows one example of a general purpose computing device in the form of a computer.

FIG. 8 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer-readable media. Computer-readable media, which include both volatile and nonvolatile media, removable and non-removable media, may be any available medium that can be accessed by computer 130. By way of example and not limitation, computer-readable media comprise computer storage media and communication media. Computer storage media include volatile and nonvolatile, removable and non-removable media implemented in any method or technology for storage of information such as computer-readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer-readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer-readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 8 illustrates operating system 144, application programs 146, other program modules 148, and program data 150.

The computer 130 may also include other removable/non-removable, volatile/nonvolatile computer storage media. For example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer-readable instructions, data structures, program modules and other data for the computer 130. In FIG. 8, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 8 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIG. 4, FIG. 5 and FIG. 6 to modify to retrieve and/or update revoked certificate data.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the constructions and methods without departing from the scope of the invention, it is intended that all matter contained in the above description and shown in the accompanying drawings shall be interpreted as illustrative and not in a limiting sense.

What is claimed is:

1. A method for authenticating a user certificate received from a user requesting access to a secure web service, said user certificate including user certificate data, said method comprising:

receiving a request from a user for access to the web service, said request including partial data supporting the user certificate data;

retrieving revoked certificate data from a plurality of certificate issuers, wherein the revoked certificate data identifies one or more revoked certificates, said each of the one or more identified revoked certificates including a next update time for retrieving an update to each of the revoked certificates and an address identifying a location for retrieving the update;

storing the revoked certificate data in a central location;

determining if the user certificate data has expired;

if the determining indicates that the received user certificate data has expired, denying the user accessing the secure web service;

if the determining indicates that the received user certificate data has not expired:

comparing the user certificate data included in the received request to the revoked certificate data stored in the central location;

if the comparing indicates that the user certificate data from the requested user certificate matches one of the revoked certificate data stored in the central location, denying the user access to the secure web service;

if the comparing indicates that the user certificate data from the requested user certificate does not match the revoked certificate data stored in the central location, determining if the update to one of the revoked certificates is available based on the next update time;

if the determining indicates that no update is available, authenticating the user to access the secured web service;

if the determining indicates that the update is available, retrieving the update from the address;

in response to the retrieved update, storing the update to one of the revoked certificates in the central location;

if the comparing indicates that the user certificate data matches the updated revoked certificate data in the central location, denying the user access to the secure web service;

if the comparing indicates that the user certificate data does not match one of the updated revoked certificate data in the central location:

authenticating the user;

providing the user access to the requested web service;

detecting an event including a new entry in the central location, a current time equals to the next update time of one of the revoked certificate data or the current time equals to the next update time of one of the updated revoked certificate data;

organizing the user certificate data in the revoked certificate data in a sequence according to the next update time for each of the plurality of certificate issuers; and in response to the detected event and the next update time, retrieving another update of one of the revoked certificate in the central location according to the organized sequence.

2. The method of claim 1, wherein the user certificate data includes a unique identifier identifying a particular certificate issued to the user, and wherein authenticating the user includes determining whether the unique identifier included with the request corresponds to a unique identifier included in the revoked certificate data.

3. The method of claim 1, wherein the user certificate data includes an expiration date identifying a date after which the certificate issued to the user is invalid, and wherein authenticating the user includes determining whether the expiration date is prior to a current date or after the current date, and providing the authenticated user access to the requested web service when the expiration date is determined to be after to the current date.

4. The method of claim 1, wherein retrieving the revoked certificate data from a plurality of certificate issuers includes:

identifying an address from the user certificate data included with the request, said address identifying the location of revoked certificate data for a plurality of revoked certificates being maintained by at least one of the plurality of certificate issuers; and retrieving the revoked certificate data from the location identified by the identified address.

5. The method of claim 4, wherein the identified address is a uniform resource locator corresponding to a web service storing revoked certificate data.

6. The method of claim 4 further including comparing user certificate data to the retrieved revoked certificate data stored in the central location to identify a new a list of addresses corresponding to a plurality of different revoked certificates.

7. The method of claim 4, wherein identifying the address from the user certificate data included with the request includes identifying the location of a certificate revocation list, said certificate revocation list listing revoked certificate data for a plurality of revoked certificate data being maintained by at least one of the plurality of certificate issuers.

8. The method of claim 1, wherein the retrieving includes retrieving revoked certificates previously stored in the central location.

9. A method for adding additional revoked certificate data from a plurality of certificate issuers to revoked certificate data stored in a central location, said stored revoked certificate data identifying one or more certificate issuers publishing revoked certificate data for a plurality of revoked certificates, comprising:

retrieving the stored revoked certificate data from the central location;

comparing a user certificate data included in a user certificate included in a user request to the stored revoked certificate data, said user request being received from a user;

determining if the user certificate data has expired;

if the determining indicates that the received user certificate data has expired, denying the user accessing a secure web service;

if the determining indicates that the received user certificate data has not expired:

denying the user if the comparing indicates that the user certificate data matches the revoked certificate data in the central location;

if the comparing indicates that the user certificate data from the requested user certificate does not match the revoked certificate data stored in the central location:

identifying an address of each of the one or more certificate issuers from the retrieved revoked certificate data;

authenticating the user;

providing the user access to the requested web service;

storing the address in the central location for subsequent retrieval; determining a next update time for each of the one or more certificate issuers from the retrieved revoked certificate data, said next update times each specifying a time updated revoked certificate data is published by each of the one or more certificate issuer;

organizing the retrieved revoked certificate data in a sequence according to the determined update time for each of the one or more certificate issuers; and retrieving additional revoked certificate data from the identified addresses according to update times in the organized sequence such that the user certificate included in the user request is compared to the retrieved additional revoked certificate data to determine the access by the user to the secure web service.

10. The method of claim 9, wherein determining the update time includes parsing the retrieved revoked certificate data to determine update times, and wherein the identifying an address of a certificate issuer includes parsing the revoked certificate data to identify a uniform resource locator (URL) identifying an Internet address of the certificate issuer.

11. A system for retrieving revoked certificate data in response to a client request, said client request requesting access to a secure web service and including user certificate data, comprising:

a central database;

a fetching server for retrieving revoked certificate data from a plurality of certificate authority servers for storage in said central database, wherein the revoked certificate data identifies one or more revoked certificates; and an authentication server responsive to the client request for executing a certificate revocation provider component, said certificate revocation provider component loading the revoked certificate data in the central database into a memory associated with the authentication server, and wherein the certificate revocation provider component is responsive to the client request and loaded revoked certificate data to determine if the client request is authentic based on a match of the client request and the stored revoked certificate data, wherein, if the client request is expired, the authentication server denies the user;

if the client request is not expired and if a match of the client request and the stored revoked certificate data is not found; determining if the update to one of the revoked certificates is available based on the next update time;
if the determining indicates that no update is available, the authentication server authenticates the user to access the secured web service;
if the determining indicates that the update is available, the fetching server retrieves the update from the address;
in response to the retrieved update, the certification revocation provider component stores the update to one of the revoked certificates in the central database;
if the comparing indicates that the user certificate data matches the updated revoked certificate data in the central database, the authentication server denies the user access to the secure web service;
if the comparing indicates that the user certificate data does not match one of the updated revoked certificate data in the central database:
the authentication server authenticates the user;
the authentication server detects an event including a new entry in the central database, a current time equals to the next update time of one of the revoked certificate data or the current time equals to the next update time of one of the updated revoked certificate data;
wherein the fetching server organizes the retrieved revoked certificate data in a sequence according to the next update time for each of the one or more certificate authority servers; and
in response to the detected event and the next update time, the fetching server retrieves another update of one of the revoked certificate in the central database according to the organized sequence.

12. The system of claim 11, wherein the certificate revocation provider service examines an expiration date included in the revoked certificate data to determine if the client is authorized to access the requested web service.

13. The system of claim 11, wherein the certificate revocation provider service further examines a next update time included in loaded revoked certificate data to determine if the loaded revoked certificate data is the latest revoked certificate data.

14. The system of claim 11, wherein the fetching server includes a default address identifying the location of a certificate authority server publishing revoked certificate data for a list of revoked certificates, and wherein the fetching server retrieves the revoked certificate data from the certificate authority having the default address.

15. The system of claim 11, wherein the fetching server includes a fetching table maintaining revoked certificate data for a plurality of revoked certificates previously retrieved from a certificate authority server, and wherein revoked certificate data maintained in the fetching table identifies an address of a certificate authority server maintaining a list of revoked certificates, and wherein the fetching server retrieves additional revoked certificate data from the certificate authority having the identified address.

16. The system of claim 15, wherein the certificate revocation provider service further compares retrieved revoked certificate data to user certificate data to identify a new a list of addresses corresponding to a plurality of revoked certificates.

17. A system for managing certificate revocation status data, comprising:
a fetching server for identifying a list of addresses corresponding to a plurality of certificate issuers, said fetching server retrieving revoked certificate status data from a content server corresponding to the list of addresses; and
a central database responsive to the retrieved revoked certificate status data for storing a list of revoked certificates,
wherein if the comparing indicates that the user certificate data from the requested user certificate does not match the revoked certificate data stored in the central location, determining if the update to one of the revoked certificates is available based on the next update time;
if the determining indicates that no update is available, authenticating the user to access the secured web service;
if the determining indicates that the update is available, retrieving the update from the address;
in response to the retrieved update, storing the update to one of the revoked certificates in the central location;
if the comparing indicates that the user certificate data matches the updated revoked certificate data in the central location, denying the user access to the secure web service;
if the comparing indicates that the user certificate data does not match one of the updated revoked certificate data in the central location:
authenticating the user;
providing the user access to the requested web service;
detecting an event including a new entry in the central location, a current time equals to the next update time of one of the revoked certificate data or the current time equals to the next update time of one of the updated revoked certificate data; and
wherein the fetching server organizes the retrieved revoked certificate data in a sequence according to the next update time for each of the one or more certificate issuers;
in response to the detected event, retrieving another update of one of the revoked certificate in the central location; and
wherein the fetching server identifying a address from a user certificate data included in a client request for the stored the list of revoked certificates if it is determined that there is no match between the user certificate data and retrieved certificate status data, said address identifying the location of revoked certificate data for a plurality of revoked certificates being maintained by at least one of the plurality of certificate issuers, and wherein the central database stores the address in the central location for subsequent retrieval according to the next update time in the organized sequence.

18. A computer storage medium comprising computer-executable instructions for authenticating a user requesting access to a web service, comprising
retrieving instructions for retrieving revoked certificate data from a plurality of certificate issuers, wherein the revoked certificate data identifies one or more revoked certificates;
storing instructions for storing the revoked certificate data for each of the identified one or more revoked certificates in a central location;
receiving instructions for receiving a request from a user for access to the web service, said request including a user certificate including user certificate data;
comparing instructions for comparing the user certificate data to the revoked certificate data stored in the central location;

denying instructions for selectively authenticating the user if the comparing indicates that the user certificate data matches the revoked certificate data in the central location;

if the comparing indicates that the user certificate data from the requested user certificate does not match the revoked certificate data stored in the central location:

determining instructions for determining if the update to one of the revoked certificates is available based on the next update time;

if the determining indicates that no update is available, authentication instructions for authenticating the user to access the secured web service;

if the determining indicates that the update is available, retrieving instructions for retrieving the update from the address;

in response to the retrieved update, storing instructions for storing the update to one of the revoked certificates in the central location;

wherein the authentication instructions authenticate the user;

wherein the providing instructions provide the user access to the requested web service;

identifying instructions for identifying an address from the user certificate data included with the request, said address identifying the location of revoked certificate data for a plurality of revoked certificates being maintained by at least one of the plurality of certificate issuers;

organizing instructions for organizing the retrieved revoked certificate data in a sequence according to the next update time for each of the one or more certificate authority servers; and wherein the storing instructions store the address in the central location for subsequent retrieval according to the next update time in the organized sequence.

19. The computer storage medium of claim 18 wherein user certificate data includes a unique identifier identifying a particular certificate issued to the user, and wherein authenticating the user includes instructions for determining whether the unique identifier included with the request corresponds to a unique identifier included in the revoked certificate data.

20. The computer storage medium of claim 18 wherein user certificate data includes an expiration date identifying a date after which the certificate issued to the user is invalid, and wherein authenticating the user includes instructions for determining whether the expiration date is prior to a current date or after the current date, and wherein providing instructions provide the identified authentic user access to the requested web service when the expiration date is determined to be after to the current date.

21. The computer storage medium of claim 18, wherein the instructions for retrieving the revoked certificate data from a plurality of certificate issuers include instructions for identifying an address from the user certificate data included with the request, said address identifying a location for revoked certificate data being published by at least one of the plurality of certificate issuers, and wherein the retrieving instructions include instructions for retrieving the revoked certificate data from the identified location.

22. A computer storage medium for adding additional revoked certificate data to revoked certificate data stored in a central location, said stored revoked certificate data identifying one or more certificate issuers publishing revoked certificate data for a plurality of revoked certificates, comprising:

retrieving instructions for retrieving the stored revoked certificate data from the central location;

comparing instructions for comparing a user certificate data included in a user certificate included in a user request to the stored revoked certificate data, said user request being received from a user;

denying instructions for authenticating the user if the comparing indicates that the user certificate data matches the revoked certificate data in the central location;

providing instructions for providing the user access to the requested web service when the user is authenticated:

identifying instructions for identifying an address of each of the one or more certificate issuers from the retrieved revoked certificate data;

if the comparing indicates that the user certificate data from the requested user certificate does not match the revoked certificate data stored in the central location:

determining instructions for determining if the update to one of the revoked certificates is available based on the next update time;

if the determining indicates that no update is available, authentication instructions for authenticating the user to access the secured web service;

if the determining indicates that the update is available, retrieving instructions for retrieving the update from the address;

in response to the retrieved update, storing instructions for storing the update to one of the revoked certificates in the central location;

wherein the authenticating instructions authenticate the user;

wherein the providing instructions provide the user access to the requested web service;

wherein the identifying instructions identify another address from the user certificate data included with the request, said address identifying the location of revoked certificate data for a plurality of revoked certificates being maintained by at least one of the plurality of certificate issuers;

wherein the storing instructions store the another address in the central location for subsequent retrieval;

determining instructions for determining an update time for each of the one or more certificate issuers from the retrieved revoked certificate data, said update times each specifying a time updated revoked certificate data is published by each of the one or more certificate issuer;

organizing instructions for organizing the retrieved revoked certificate data in a sequence according to the determined update time for each of the plurality of certificate issuers; and retrieving instructions for retrieving additional revoked certificate data from the identified addresses according to update times in the organized sequence.

* * * * *